United States Patent [19]

Kinoshita et al.

[11] Patent Number: 4,994,006
[45] Date of Patent: Feb. 19, 1991

[54] AUTOMATIC TRANSMISSION FOR VEHICLE HAVING STICK-FREE RADIALLY DUPLICATE CLUTCHES

[75] Inventors: Masafumi Kinoshita, Toyota; Tokuyuki Takahashi, Aichi; Hiroshi Itoh, Toyota, all of Japan

[73] Assignee: Toyota Jidosha Kabushiki Kaisha, Toyota, Japan

[21] Appl. No.: 413,488

[22] Filed: Sep. 27, 1989

[30] Foreign Application Priority Data

Sep. 27, 1988 [JP] Japan .................. 63-241780

[51] Int. Cl.⁵ .............................. F16H 57/10
[52] U.S. Cl. .................. 475/286; 192/70.2; 192/87.15
[58] Field of Search ............. 475/280-292, 475/316, 322, 328; 192/70.2, 87.15, 85 AA

[56] References Cited

U.S. PATENT DOCUMENTS

| 4,711,138 | 12/1987 | Miura et al. | 475/283 X |
| 4,716,787 | 1/1988 | Miura et al. | 475/283 X |
| 4,722,242 | 2/1988 | Miura et al. | 475/283 X |
| 4,836,052 | 6/1989 | Iwanaga et al. | 192/85 AA X |
| 4,864,892 | 9/1989 | Ando et al. | 475/283 X |

FOREIGN PATENT DOCUMENTS 62-141343  6/1987  Japan .

OTHER PUBLICATIONS

Chrysler Motors Corp. Publication No. 890528, "The Chrysler A-604 Ultradrive 4-Speed Automatic Transaxle", Berthold Martin et al, pp. 167-182.
Chrysler Motors Corp. Publication No. 890528, "The All-Adaptive Controls for the Chrysler Ultradrive Transaxle", Maurice Leising et al, pp. 45-53.

Primary Examiner—Rodney H. Bonck
Assistant Examiner—Benjamin Levi
Attorney, Agent, or Firm—Oblon, Spivak, McClelland, Maier & Neustadt

[57] ABSTRACT

In an automatic transmission for a vehicle having an input rotational member, an output rotational member, a rotational speed change gear mechanism, clutches and brakes for changing a route of transmittance of torque between the input rotational member and the output rotational member through the rotational speed change gear mechanism in accordance with selective engagement and disengagement of the clutches and brakes so as to provide a plurality of forward speed stages and a reverse stage, a first one of the clutches is constructed to house a second one of the clutches at a radially inside thereof with a piston member of the first clutch serving as a member for transmitting torque through the second clutch, the second clutch being never engaged immediately after disengagement of the first clutch under any operating condition of the vehicle.

2 Claims, 2 Drawing Sheets

|      | C1  | C2  | C3  | C4  | B1  | B2  | F1  | F2  |
|------|-----|-----|-----|-----|-----|-----|-----|-----|
| 1ST  | ○   |     |     |     |     | (○) | ○   | ○   |
| 2ND  | ○   |     |     | ○   | (○) |     |     | ○   |
| 3RD  | ○   | ○   |     | ○   |     |     | ○   |     |
| 4TH  |     | ○   |     | ○   | ○   |     |     |     |
| REV. |     |     | ○   |     |     | ○   |     |     |

AUTOMATIC TRANSMISSION FOR VEHICLE HAVING STICK-FREE RADIALLY DUPLICATE CLUTCHES

BACKGROUND OF THE INVENTION

1. Field of the Invention

The present invention relates to an automatic transmission for a vehicle, and more particularly, an improvement in the arrangement of the clutches incorporated in the automatic transmission for a vehicle.

2. Description of the Prior Art

An automatic transmission for a vehicle generally comprises an input rotational member, an output rotational member, a rotational speed change gear mechanism, and clutches and brakes for changing over a route of transmittance of torque between said input rotational member and said output rotational member through said rotational speed change gear mechanism in accordance with selective engagement and disengagement of the clutches and the brakes, so as selectively to provide a plurality of gear stages such as forward speed stages and a reverse stage. In the automatic transmission of this kind the torque can not generally be transmitted monotonously from one axial end thereof toward the other axial end thereof, but must be transmitted repeatedly forward and backward in the transmission mechanism in order to provide various speed stages at desired gear ratios. Therefore, the clutches and the brakes incorporated in the transmission mechanism are generally allowed to occupy only a limited annular space corresponding to a relatively small part of the radial dimension available in a generally circular cross section of the transmission mechanism, so as to allow other torque transmitting members to pass therethrough or therearound. Therefore, in order to have a required torque transmitting capacity the clutches and the brakes are generally constructed to have a number of annular friction elements piled up one over the other in the axial direction with the alternate ones thereof being respectively torque transmittingly carried by an annular input clutch member and an annular output clutch member telescopingly arranged relative to one another. Therefore, the clutches and the brakes generally require a relatively large axial dimension.

In view of such particular conditions it has been considered to arrange two clutches in a radially duplicate structure so that a first clutch having a first rotational cylinder member and a first rotational piston member received therein to construct a first cylinder-piston actuator for selectively axially compressing an axial pile of annular friction elements for the first clutch houses radially therein a second clutch having a second rotational piston member received in said first rotational piston member which also serves as a second rotational cylinder member for the second clutch so as thereby to construct a second cylinder-piston actuator positioned radially inside said first cylinder-piston actuator for selectively axially compressing an axial pile of friction elements for the second clutch, as described in U.S. Pat. No. 4,716,787.

In such a radially duplicate clutch structure said first rotational piston member operates as one of the input and output rotational members of the radially inside clutch, and therefore the first rotational piston member must be torque transmittingly connected with the first rotational cylinder member which also serves as one of the input and output rotational members of the radially inside clutch. Therefore, the first rotational cylinder member and the first rotational piston member are formed with axial splines at a radially inside surface portion thereof and at a radially outside surface portion thereof, respectively, and engaged with one another to transmit torque therebetween, while allowing the first rotational piston member to move relative to the first rotational cylinder member in axial directions.

In such a radially duplicate clutch structure, if the torque transmittance is switched over from the first or outside clutch to the second or inside clutch for switching over gear stages of the transmission, a pressure fluid which has been supplied in a pressure chamber defined between the first rotational cylinder member and the first rotational piston member will be exhausted while a fluid pressure will be newly introduced into a second pressure chamber defined between the first rotational piston member and the second rotational piston member. However, if the second clutch starts to transmit a substantial torque before the first rotational piston member retracts sufficiently to release the compression which has been applied to the axial pile of the annular friction elements for the first clutch, the torque load applied between the first rotational cylinder member and the first rotational piston member via said spline engagement therebetween will brake a smooth retracting movement of the first rotational piston member relative to the first rotational cylinder member. If this once occurs, as this braking torque increases more as the second clutch is more tightly engaged for full operation thereof, the first clutch will remain in a half engaged condition throughout the operating period of the second clutch and will suffer heavy wearing. In a more serious instance, if the supply of pressure fluid to the second pressure chamber is more early relative to the discharge of the pressure fluid from the first pressure chamber, the first clutch will remain in the engaged condition, so that the transmission will be erroneously shifted to another speed stage in which the first and the second clutches are both engaged. According to the design of the return spring (70) which is constructed to have such a relatively moderate spring force as to be readily overcome by the force of servo pressure supplied either to the first pressure chamber (65) or the second pressure chamber (67) to allow either the first rotational piston member (62) or the second rotational piston member (63) to move against the return spring so as to satisfactorily compress the axial pile of the corresponding annular friction elements, the full return of the first rotational piston member (62) relative to the first rotational cylinder member (54) will be guaranteed only when no substantial torque is applied between the first rotational cylinder member (54) and the first rotational piston member (62). In fact, in the transmission shown in the above-mentioned U.S. Pat. No. 4,716,787, the first clutch (C1) is engaged to provide 1st through 3rd speed stages, (4th speed in the gear train of FIG. 6) while the second clutch (C2) is engaged to provide the reverse stage with disengagement of the first clutch or is engaged together with the first clutch to provide the 3rd speed stage (4th speed in the gear train of FIG. 6). Therefore, it might occur that if the driver hurries to back the vehicle when the manual lever has been set at the "D" range position, the automatic transmission provides the 3rd speed stage (4th speed stage in this case) or, if the matter is not so serious, the friction elements of the 1st clutch suffer heavy wearing.

SUMMARY OF THE INVENTION

It is therefore the object of the present invention to solve the above-mentioned problem in the radially duplicate clutches and to provide an automatic transmission for a vehicle having radially duplicate clutches which are free from the above-mentioned problem of interlocking.

According to the present invention the above-mentioned object is accomplished by an automatic transmission for a vehicle comprising an input rotational member, an output rotational member, a rotational speed change gear mechanism, clutches, and brakes, said clutches and brakes changing a route of transmittance of torque between said input rotational member and said output rotational member through said rotational speed change gear mechanism in accordance with selective engagement and disengagement thereof so as to provide a plurality of forward speed stages and a reverse stage, said clutches including a first clutch comprising a first rotational cylinder member serving as an input rotational member of said first clutch and having a first cylinder chamber space therein, a first rotational piston member received in said first cylinder chamber space so as to define a first pressure chamber therein and torque transmittingly engaged with said first rotational cylinder member and having a second cylinder chamber space therein, an output rotational member, an input friction element torque transmittingly carried by said first rotational cylinder member, and an output friction element torque transmittingly carried by said output rotational member of said first clutch, said input and output friction elements of said first clutch being torque transmittingly pressed to one another as supported between said first rotational cylinder member and said first rotational piston member when said first pressure chamber is supplied with a pressure fluid, so as to transmit torque between said input and output rotational members of said first clutch, and a second clutch comprising an input rotational member provided by a combination of said first rotational cylinder member and said first rotational piston member torque transmittingly engaged with one another, a second rotational piston member received in said second cylinder chamber space of said first rotational piston member so as to define a second pressure chamber therein, an output rotational member, an input friction element torque transmittingly carried by said first rotational piston member, and an output friction element torque transmittingly carried by said output rotational member of said second clutch, said input and output friction elements of said second clutch being torque transmittingly pressed to one another as supported between said first rotational piston member and said second rotational piston member when said second pressure chamber is supplied with a pressure fluid, so as to transmit torque between said input and output rotational members of said second clutch, wherein said second clutch is never engaged immediately after disengagement of said first clutch under any operating conditions of the vehicle.

According to a particular embodiment of the present invention, said first clutch is engaged when and only when the reverse stage is set up, and said second clutch is engaged when and only when a direct connection speed stage or a speed stage higher than said direct connection speed stage is set up.

BRIEF DESCRIPTION OF THE DRAWING

In the accompanying drawings.

DESCRIPTION OF THE PREFERRED EMBODIMENT

In the following the invention will be described in more detail with respect to a preferred embodiment thereof with reference to the accompanying drawings.

Figure 1:
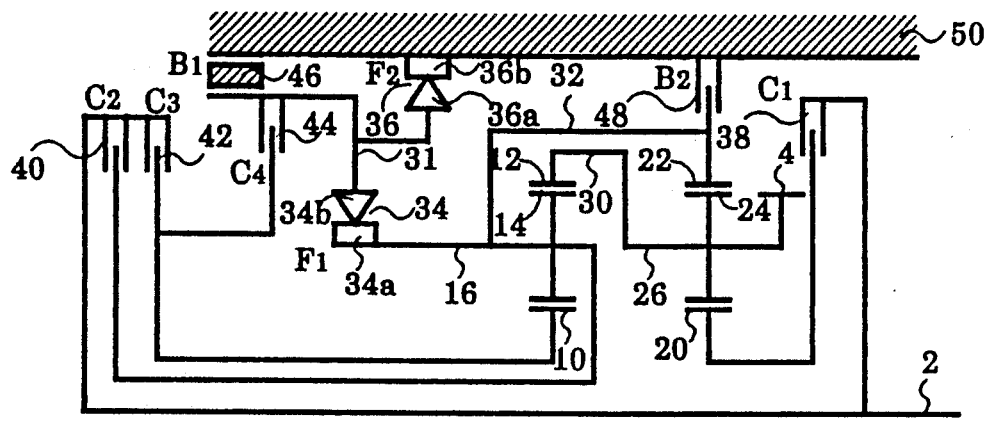
FIG. 1 is a schematic illustration of an embodiment of the automatic transmission according to the present invention with a table illustration of selective engagement of the clutches and the brakes incorporated therein at respective speed stages.

Referring to FIG. 1, the automatic transmission herein shown comprises an input rotational member 2, an output rotational member 4, a rotational speed change gear mechanism including two sets of planetary gear mechanisms, and clutches and brakes as described hereinunder. A first planetary gear mechanism has a first sun gear 10, a first ring gear 12 coaxial with the first sun gear 10, a plurality of first planetary pinions 14 meshing with the first sun gear 10 and the first ring gear 12 although only one of them is illustrated in FIG. 1, and a first carrier 16 rotatably supporting the first planetary pinions 14. A second planetary gear mechanism has a second sun gear 20, a second ring gear 22 coaxial with the second sun gear 20, a plurality of second planetary pinions 24 meshing with the second sun gear 20 and second ring gear 22 although only one of them is illustrated in FIG.1, and a second carrier 26 rotatably supporting the second planetary pinions 24. The first ring gear 12 is connected with the second carrier 26 by a connecting member 30. The first carrier 16 is connected with the second ring gear 22 by a connecting member 32.

A one way clutch F1 34 and a one way clutch F2 36 are provided in series between a housing 50 and the first carrier 16 which is also connected with the second ring gear 22 by the connecting member 32 as described above. The one way clutch F1 is closer to the first carrier 16 and the one way clutch F2 is closer to the housing 50. In more detail, the one way clutch F1 has an inner race 34a connected with the first carrier 16 and an outer race 34b connected by a connecting member 31 with an inner race 36a of the one way clutch F2 which also has an outer race 36b connected with the housing 50. The one way clutch F1 is engaged when the inner race 34a would rotate relative to the outer race 34b in a first rotational direction and slips when the inner race 34a rotates relative to the outer race 34b in a second rotational direction opposite to said first rotational direction. Similarly, the one way clutch F2 is engaged when the inner race 36a would rotate relative to the outer race 36b in said first rotational direction and slips when the inner race 36a rotates relative to the outer race 36a in said second rotational direction. The output rotational member 4 is an annular gear member connected with the second carrier 26.

A clutch C1 38 is provided between the input rotational member 2 and the second sun gear 20 for selectively connecting these two rotational members with one another. A clutch C2 40 is provided between the input rotational member 2 and the first carrier 16 for selectively connecting these two rotational members with one another. A clutch C3 42 is provided between the input rotational member 2 and the first sun gear 10 for selectively connecting these two rotational members with one another. A clutch C4 44 is provided between the first sun gear 10 and the connecting member 31 for selectively connecting the first sun gear 10 with the outer race 34b of the one way clutch F1 and the inner race 36a of the one way clutch F2.

A brake B1 46 is provided between the connecting member 31 and the housing 50 for selectively braking rotation of the connecting member 31 relative to the housing 50. A brake B2 48 is provided between the connecting member 32 and the housing 50 for selectively braking rotation of the first carrier 16 and the second ring gear 22 relative to the housing 50.

The manner of providing a 1st speed stage, a 2nd speed stage, a 3rd speed stage (direct connection stage), a 4th speed stage (overdrive stage) and a reverse stage is shown in Table 1 included at the end of this description and a Table included in FIG. 1. In these tables a circle (O) indicates that the corresponding clutch, brake or one way clutch is engaged in the engine drive state at the corresponding speed stage, and a circle in parentheses ((O)) indicates that the corresponding clutch or brake is engaged to provide the corresponding speed stage with availability of engine braking.

When the ratio of the number of gear teeth of the first ring gear 12 to that of the first sun gear 10 is $r_1$, and the ratio of the number of gear teeth of the second ring gear 22 to that of the second sun gear 20 is $r_2$, speed change gear ratios at the respective speed stages are as shown in Table 2 included at the end of this description.

Figure 2:
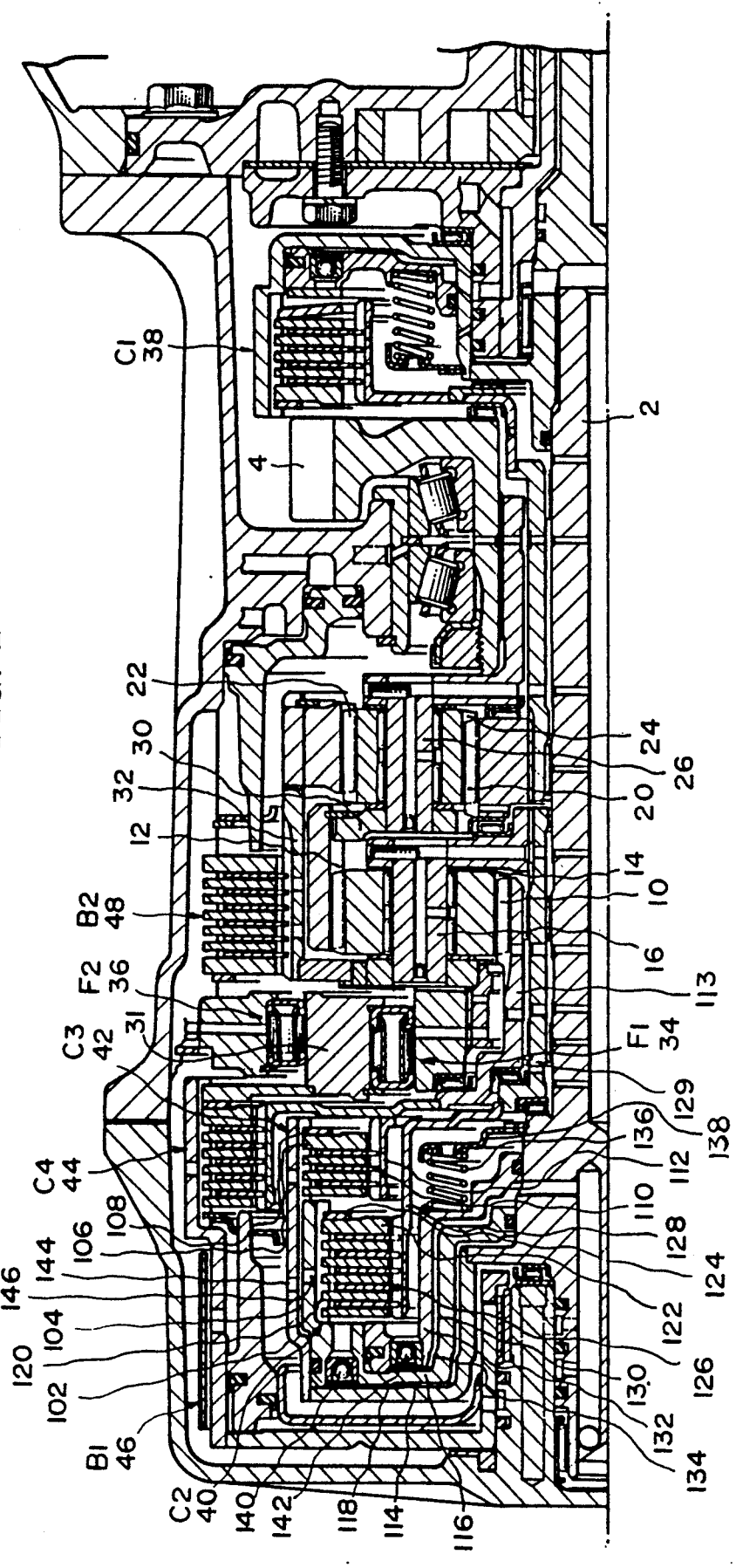
FIG. 2 is a longitudinal sectional view of a more concrete structure of an embodiment of the automatic transmission corresponding to the schematic structure shown in FIG. 1.

An embodiment of a more concrete structure of the automatic transmission corresponding to the schematic illustration in FIG. 1 is shown in FIG. 2. In FIG. 2 the portions corresponding to those shown in FIG. 1 are designated by the same reference numerals. All structural elements such as gears, clutches and brakes are of the types commonly known in this art. Therefore, a man of ordinary skill in the art will understand the detailed structures shown in FIG. 2 by comparison thereof with FIG. 1 and the above descriptions with regard to the structure shown in FIG. 1. However, some descriptions will be supplemented particularly with respect to the clutches C2 and C3 which play an important part in the present invention.

The clutch C3 42 comprises a first rotational cylinder member 102 formed to be integral with the input rotational member 2. However, it is noted herein that the "integral" does not necessarily mean that the member is completely made of a continuous material as in the strict meaning of integral. Herein the concept of "integral" is used to indicate that a certain member may be conceived as an integral member if it would be ideally constructed by disregarding the convenience of manufacture or the possibility of assembly. Therefore, in the present example of the integral member including the first rotational cylinder 102 and the input rotational member 2, it is in fact made of a cylindrical part a, an annular flange-like part b having an L-shaped cross section as seen in FIG. 2, and a shaft part c which is substantially a shaft member to provide the input rotational member 2 having a flange portion at which it is connected with the annular flange-like part b, these three parts being assembled together by welding. However, for the convenience sake of description the term "integral" will be conveniently used hereinunder in this description. From the hatching in the drawing such combinations of separately manufactured parts will be apparent for one of ordinary skill in the art.

The first rotational cylinder member 102 serves as an input rotational member for the clutch C3 and is formed with axial splines 104 at an inside surface portion thereof. Four annular friction elements one of which is relatively thicker than the other three and designated by 106 are torque transmittingly carried by the spline portion of the first rotational cylinder member 102 to be shiftable in axial directions along the splines, but the rightward axial movement of the most right friction element 106 as viewed in the figure is restricted by an annular stopper member 108. Between each two adjacent ones of these four annular friction elements 106 there are sandwiched each one of three annular friction elements one of which is designated by reference numeral 110. These annular friction elements 110 are torque transmittingly carried by a rotational member 112 which allows for a slight axial movement of the annular friction elements 110 relative thereto via an axial spline engagement and is integral with a tubular shaft 113 torque transmittingly connected with the first sun gear 10 and also integral with a rotational member bearing a similar plurality of annular friction elements serving as one of the two frictionally engaging rotational members of the clutch C4.

The first rotational cylinder member 102 has a first cylinder chamber space 114 which is an annular groove space provided by a concave longitudinal section thereof, and in this first cylinder chamber space a first rotational piston member 116 is axially slidably received to define a first pressure chamber 118 therebetween to be a part of the first cylinder chamber space 114. The first rotational piston member 116 is formed with splines at a cylindrical outer surface portion thereof as engaged with the internal splines 104 of the first rotational cylinder member 102 so that the first rotational piston member 116 is axially slidable relative to the first rotational cylinder member 102 as a piston for displacing the pressure chamber 118 but is torque transmittingly connected with the first rotational cylinder member 102. When a pressure fluid is supplied into the pressure chamber 118, the first rotational piston member 116 is driven rightward in the figure relative to the first rotational cylinder member 102 and compresses the axially alternating pile of the annular friction elements 106 and 110 in axial directions so as torque transmittingly to connect the first rotational cylinder member 102 with the rotational member 112, thus effecting the engagement of the clutch C3 so as generally to transmit torque from the first rotational cylinder member 102 serving as an input rotational member of the clutch C3 to the rotational member 112 serving as an output rotational member of the clutch C3.

The first rotational piston member 116 has an internally splined portion 120 which carries torque transmittingly six annular friction elements one of which is relatively thicker than the other five and designated by reference numeral 122. These annular friction elements are movable by the spline engagement relative to the first rotational piston member 116 in axial directions but the rightward axial movement of the most right friction element 122 as viewed in the figure relative to the first rotational piston member 116 is restricted by an annular stopper member 124. Between each two adjacent ones of these six annular friction elements there are provided each one of five annular friction elements one of which is designated by reference numeral 126 as alternately sandwiched, and these annular friction elements 126 are torque transmittingly carried by a rotational member 128 which is integral with a tubular shaft 129 torque transmittingly connected with the second carrier 16 at a right end portion thereof as viewed in the figure. The first rotational piston member 116 has a second cylinder chamber space 130 in the form of an annular groove formed therein, and in this second cylinder chamber space there is received a second rotational piston member 132 so as to define a second pressure chamber 134 to be a part of the second cylinder space 130. When a pressure fluid is supplied into the second pressure chamber 134, the second rotational piston member 132 is driven rightward in the figure relative to the first rotational piston member 116 and compresses the axially alternating pile of the annular friction elements 122 and 126, thereby effecting engagement of the clutch C2 so as to transmit rotational torque from the first rotational cylinder member 102 serving also as an input rotational member of the clutch C2 to the rotational member 128 serving as an output rotational member of the clutch C2. This torque transmission is effected through the spline engagement between the first rotational cylinder member 102 and the first rotational piston member 116. Therefore, when a torque is being transmitted through the clutch C2 under substantial engagement thereof, the axial movement of the first rotational member 116 relative to the first rotational cylinder member 102 is substantially braked by the frictional engagement therebetween at the spline portion 104 and the mating splined portion in the first rotational piston member 116 although the frictional engagement in the splined portions is of course lubricated by lubricant supplied to this area.

The first rotational piston member 116 and the second rotational piston member 132 are resiliently biased leftward in the figure by a compression spring 136 acting between the second rotational piston member 132 and a support member 138 mounted to the input rotational member 52. For further information, 140 is a non return valve for allowing oil to flow only from an internal space of the first rotational piston member 116 toward the first pressure chamber 118 for cooling purpose when the first pressure chamber 118 is not supplied with the pressure fluid (oil), and 142 is also a check valve provided in the second rotational piston member 132 for allowing oil to flow only from the internal space of the second rotational piston member 132 toward the second pressure chamber 134 for cooling purpose when the pressure fluid is not supplied to the second pressure chamber 134. Further, the first rotational cylinder member 102 is formed with a radial through opening 144, while the first rotational piston member 116 is formed with a radial through opening 146 substantially aligned with the opening 144 when the first rotational piston member 116 is fully retracted relative to the first rotational piston member 102 as shown in FIG. 2. When the oil for cooling purpose is supplied to the internal space of the first rotational piston member 116, if the first rotational piston member 116 is in the fully retracted position as shown in FIG. 2 with the clutch C3 being disengaged, a larger rate of the oil supply is conducted through the aligned openings 144 and 146 toward the clutch C4, whereas if the first rotational piston member 116 is shifted rightward in the figure relative to the first rotational cylinder member 102 to engage the clutch C3, the rate of supply of oil toward the clutch C4 is reduced by non alignment of the openings 144 and 146 and a more part of the oil supplied to the internal space of the first rotational piston member 116 is supplied around the clutch C3. Since the clutches C3 and C4 are engaged alternately, the supply of cooling oil to these clutches are thus rationalized.

Now, as will be understood from the foregoing, it is for setting up the reverse stage that the clutch C3 is engaged, whereas it is for setting up the 3rd speed stage or the 4th speed stage that the clutch C2 is engaged. In order that the clutch C3 is engaged the manual lever must be shifted at the "R" range position. Therefore, with the clutch C3 being engaged the vehicle will never be moving forward. Therefore, starting from the state that the clutch C3 is engaged, in order for the vehicle to reach a state at which the automatic transmission is shifted to the 3rd speed stage, the vehicle should necessarily start to move forward from a once stopped state. In order for the vehicle to gain a substantial speed sufficient to set up the 3rd speed stage in the automatic transmission, a substantial time laps will be required which will be long enough to complete the disengagement of the clutch C3. Therefore, it will be appreciated that according to the above-described structure of the automatic transmission the clutch C2 is never engaged immediately after disengagement of the clutch C3 under any operating conditions of the vehicle.

Although the invention has been described in detail with respect to a preferred embodiment thereof, it will be understood by those skilled in the art that other various embodiments are possible without departing from the spirit of the present invention.

TABLE 1

|  | $C_1$ 38 | $C_2$ 40 | $C_3$ 42 | $C_4$ 44 | $B_1$ 46 | $B_2$ 48 | $F_1$ 34 | $F_2$ 36 |
|---|---|---|---|---|---|---|---|---|
| 1st Speed Stage | O |  |  |  |  | (O) | O | O |
| 2nd Speed Stage | O |  |  | O | (O) |  |  | O |
| 3rd Speed Stage | O | O |  | O |  |  | O |  |
| 4th Speed Stage |  | O |  | O | O |  |  |  |
| Reverse Stage |  |  | O |  |  | O |  |  |

TABLE 2

|  | Speed Change Gear Ratio |
|---|---|
| 1st Speed Stage | $(1 + r_2)/r_2$ |
| 2nd Speed Stage | $\{(1 + r_2) - \{1/r_2(1 + r_1)\}$ |
| 3rd Speed Stage | 1 |
| 4th Speed Stage | $1/(1 + r_1)$ |
| Reverse Stage | $-1/r_1$ |

We claim:

1. An automatic transmission for a vehicle comprising an input rotational member, an output rotational member, a rotational speed change gear mechanism, clutches, and brakes, said clutches and brakes changing a route of transmittance of torque between said input rotational member and said output rotational member through said rotational speed change gear mechanism in accordance with selective engagement and disengagement thereof so as to provide a series of shift stages including a reverse stage and sequential forward speed stages of gradually rising speed, said clutches including a first clutch comprising a first rotational cylinder member serving as an input rotational member of said first clutch and having a first cylinder chamber space therein, a first rotational piston member received in said first cylinder chamber space so as to define a first pressure chamber therein and torque transmittingly engaged with said first rotational cylinder member and having a second cylinder chamber space therein, an output rotational member of said first clutch, an input friction element of said first clutch torque transmittingly carried by said first rotational cylinder member, and an output friction element of said first clutch torque transmittingly carried by said output rotational member of said first clutch, said input and output friction elements of said first clutch being torque transmittingly pressed to one another as supported between said first rotational cylinder member and said first rotational piston member when said first pressure chamber is supplied with a pressure fluid, so as to transmit torque between said input and output rotational members of said first clutch, and a second clutch comprising an input rotational member provided by a combination of said first rotational cylinder member and said first rotational piston member torque transmittingly engaged with one another, a second rotational piston member received in said second cylinder chamber space of said first rotational piston member so as to define a second pressure chamber therein, an output rotational member of said second clutch, an input friction element of said second clutch torque transmittingly carried by said first rotational piston member, and an output friction element of said second clutch torque transmittingly carried by said output rotational member of said second clutch, said input and output friction elements of said second clutch being torque transmittingly pressed to one another as supported between said first rotational piston member and said second rotational piston member when said second pressure chamber is supplied with a pressure fluid, so as to transmit torque between said input and output rotational members of said second clutch, wherein said second clutch is always disengaged in a shift stage adjacent to any shift stage in which said first clutch is engaged.

2. An automatic transmission according to claim 1, wherein said first clutch is engaged only at said reverse stage, and said second clutch is not engaged at a lowest forward speed stage.

* * * * *